US006968535B2

(12) United States Patent
Stelting et al.

(10) Patent No.: US 6,968,535 B2
(45) Date of Patent: Nov. 22, 2005

(54) SERVICE MAPPING METHOD OF ENTERPRISE APPLICATION MODELING AND DEVELOPMENT FOR MULTI-TIER SERVICE ENVIRONMENTS

(75) Inventors: Stephen A. Stelting, Broomfield, CO (US); Katherine J. Sierra, Boulder, CO (US)

(73) Assignee: Sun Microsystems, Inc., Palo Alto, CA (US)

( * ) Notice: Subject to any disclaimer, the term of this patent is extended or adjusted under 35 U.S.C. 154(b) by 489 days.

(21) Appl. No.: 10/137,756

(22) Filed: Apr. 30, 2002

(65) Prior Publication Data

US 2003/0182461 A1 Sep. 25, 2003

Related U.S. Application Data

(60) Provisional application No. 60/366,190, filed on Mar. 21, 2002.

(51) Int. Cl.$^7$ .................................................. G06F 9/44
(52) U.S. Cl. ........................ 717/104; 717/103; 719/310; 709/230; 705/500
(58) Field of Search ................. 717/100–116, 120–121; 719/310, 328, 313–316, 319–320, 330; 709/200, 201, 203, 230; 705/1, 500, 7–8

(56) References Cited

U.S. PATENT DOCUMENTS

| | | | |
|---|---|---|---|
| 5,845,289 A | 12/1998 | Baumeister et al. | 707/103 R |
| 6,349,298 B1 | 2/2002 | Malone et al. | 707/7 |
| 6,678,668 B2 | 1/2004 | Fisher et al. | 706/14 |
| 2002/0026630 A1 | 2/2002 | Schmidt et al. | 717/103 |
| 2002/0198727 A1 | 12/2002 | Ann et al. | 705/1 |

*Primary Examiner*—Antony Nguyen-Ba
(74) *Attorney, Agent, or Firm*—Kent A. Lembke; William J. Kubida; Hogan & Hartson LLP

(57) ABSTRACT

A method for modeling an enterprise application to be performed over multiple tiers in a distributed computer system. The method includes generating a model, such as a sequence diagram, of the enterprise application showing the tiers with standard responsibilities assigned to a client tier, a Web tier, a business logic tier, and an enterprise information system tier. The standard functions are assigned by identifying protocol services and mapping these to the tiers. Business functions for the application are identified with use cases. The basic business services are then mapped to the enterprise application model. This model is then further modified, such as by subdividing the tiers into subtiers, and mapping the detailed business services to the appropriate tiers. The method continues with identifying of architectural goals or capabilities and modifying of the enterprise application model to map or implement the architectural services associated with each goal to the tiers.

26 Claims, 8 Drawing Sheets

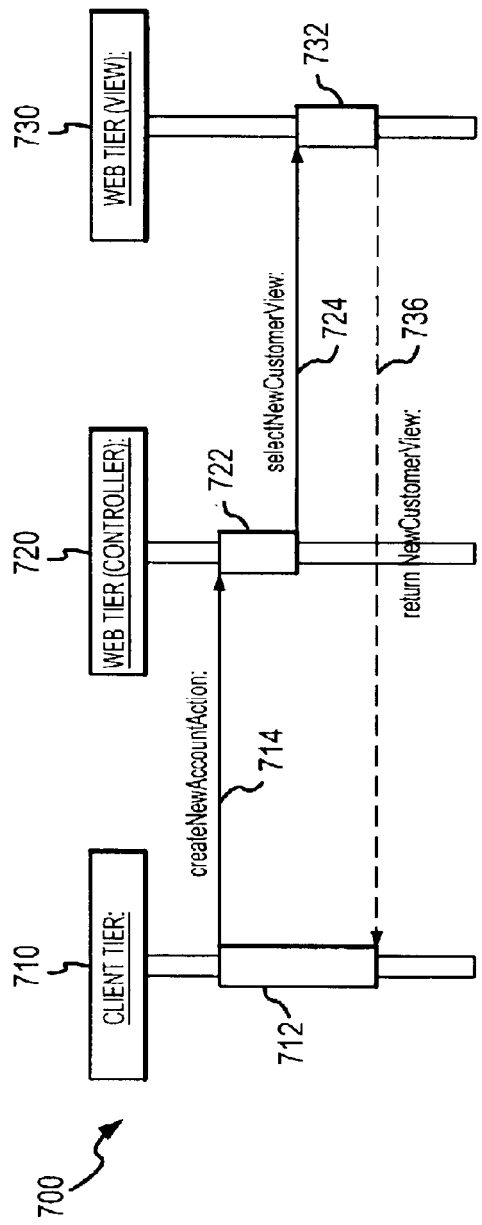
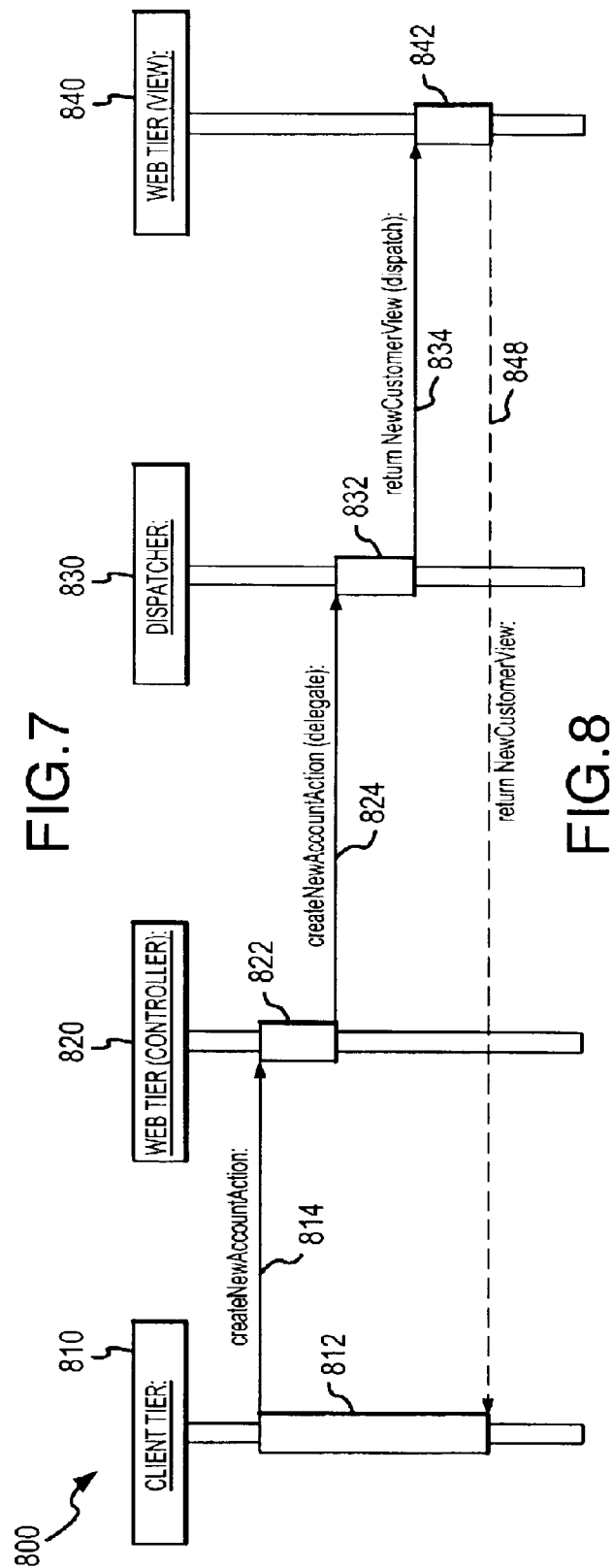
FIG.7
FIG.8

SERVICE MAPPING METHOD OF ENTERPRISE APPLICATION MODELING AND DEVELOPMENT FOR MULTI-TIER SERVICE ENVIRONMENTS

CROSS REFERENCE TO RELATED APPLICATIONS

This application claims the benefit of U.S. Provisional Application No. 60/366,190, filed Mar. 21, 2002, which is incorporated by reference herein in its entirety.

BACKGROUND OF THE INVENTION

1. Field of the Invention

The present invention relates, in general, to distributed computing systems, and, more particularly, to a standardized method of modeling and developing multi-tier software applications running on different servers and communicating over a network such as the Internet.

2. Relevant Background.

Enterprises continually need to extend their reach, reduce their costs, and lower their response times by providing easy-to-access services to their customers, partners, employees, and suppliers (e.g., the enterprise's clients). Typically, the enterprises utilize the Internet and other data communication networks to provide these services and to quickly communicate with their clients. The applications enterprises use to provide these services are hosted on servers and other computer devices linked to the communication network. The service applications or service system needs to combine existing enterprise information systems (EIS) with new business functions that deliver the services to a broad range of clients. The clients demand that the services are highly available to meet the needs of the global business environment, secure to protect the privacy of users and the integrity of enterprise data, and reliable and scalable to insure that business transactions are accurately and promptly processed.

For a variety of reasons, these services are generally architected as distributed applications having several tiers, including clients on the front end, data resources (e.g., EIS) on the back end, and one or more middle tiers between them where much of the application work is done. For example, the middle tiers generally implement services that integrate existing EISs with the business functions and data of business services. The middle tiers shield the client tier from the complexity of the enterprise and leverage Internet technologies to reduce user administration and training. An example of such a multi-tiered, object-oriented platform is the Java™ 2 Platform, Enterprise Edition (J2EE) architectural model which provides a component and service-based model having four tiers including a client tier, a Web tier, a business function tier (e.g., an Enterprise JavaBeans™ tier), and an enterprise information system tier (e.g., an EIS tier). The containers provide the runtime support for the application components within each tier.

While a multi-tiered environment can reduce costs and hide complexity from clients and developers, the underlying applications are inherently complex and potentially access data from a variety of sources and distribute application functionality to a variety of clients. Today's enterprises need to gain competitive advantage by quickly developing and deploying custom applications that provide unique business services. Whether the applications are internal for increasing employee productivity or external (such as those made available over the Internet) for providing specialized customer or vendor services, quick design and development of the applications are the keys to success. Additionally, the enterprise applications providing the services need to provide portability and scalability to ensure longer-term viability (e.g., the service may need to be tested as a small working prototype but be scaled up to a complete 24 by 7, enterprise-wide service that is accessible by hundreds or thousands of clients).

Unfortunately, services provided by multi-tier applications have proven difficult to properly design, architect, and develop. Creating these services requires bringing together a variety of skill sets and resources, legacy code and data. In today's heterogeneous environment, enterprise applications have to integrate services from a variety of vendors with a diverse set of application models and other standards. Industry experience shows that integrating these resources can take up to 50 percent of application development time. Some tools have been developed for use in multi-tiered environments but have not provided a standardized method for modeling and then developing multi-tier applications. For example, developers often try to build on prior development work, such as by utilizing patterns that describe common solutions to object-oriented development problems. However, patterns are only available for general problems and are typically not useful for modeling a service system for a particular implementation (possibly only providing a piece of the puzzle). The Unified Modeling Language (UML) is another tool that is often used by developers to design object-oriented software. UML is useful for providing a number of techniques for modeling a system. While providing a useful modeling notation, UML does not include any systemized framework for use of the diagrams. Consequently, individual developers, programming methodologies, and modeling software tend to use UML in a piecemeal fashion, selectively using some diagrams and ignoring others. Hence, the available development tools fail to meet the need of the industry for quickly and effectively designing multi-tier service-based systems to enable rapid development and deployment of unique business functions and services.

There remains a need for an improved method and technique for system design and development in complex, multi-tiered, object-oriented service environments. Preferably, such a method and system would provide system developers with a straightforward, intuitive way to model and develop object-oriented applications and service systems that are demonstrably well-designed and have desired and developer-selected architectural characteristics.

SUMMARY OF THE INVENTION

The present invention addresses the complexities of modeling and developing a multi-tier enterprise application by providing a unique modeling method that facilitates layer by layer modeling of the services provided in the tiers for the application. The method involves grouping of the services provided by tiers (e.g., a client tier, a Web tier, a business logic tier, and an enterprise information system tier) into protocol services, business services, and architectural services. The modeling method of the invention provides a paradigm where the services create layers of services with protocol services being the lowest or foundation layer, the business services being a layer built on the protocol services layer, and the architectural services being built as a top layer. In other words, the enterprise application can be modeled layer by layer to create a complex enterprise model from relatively simple service overlays.

Briefly, the method involves modeling the enterprise system as a set of services. There are three standard types of services recognized in this model: protocol, business, and architectural services. Differentiating services in this manner allows an enterprise system to be built up in progressive layers. First, the protocol services are identified, and a general model is created, associating the protocol services with the tiers of the system. Next, the basic business services are identified and mapped onto the protocol services or general model. The business responsibilities are refined in progressively greater detail in a series of successive modifications to the initial business service mapping. Finally, architectural goals and priorities are established for the system, and those goals are used to modify the business service model to produce a final model for the enterprise system. During the business and architectural service mapping, modification of the model frequently involves breaking elements of a tier into sub-elements and then mapping the more detailed services onto the model.

More particularly, a manual or computer method is provided for modeling an enterprise application to be performed over multiple tiers in a distributed computer system. The method includes generating a model, such as a UML sequence diagram, of the enterprise application showing the tiers with standard responsibilities or functions assigned to the tiers. In J2EE embodiments, the tiers are a client tier, a Web tier, a business logic tier, and an enterprise information system tier. The standard functions are assigned by identifying the protocol services for the enterprise system and mapping these services to the appropriate tiers. The method continues with receiving or providing the business functions (basic and/or detailed) for the application by using UML use cases or other techniques. The basic business services are then mapped to the enterprise application model. The model is then further refined, such as by subdividing the tiers into subtiers, and mapping the detailed business services to the appropriate tiers. The method continues with the identifying or receiving of architectural goals or capabilities (such as, but not limited to, security, transactions, resource management, scalability, flexibility, and maintainability) and the modifying of the enterprise application model to map or implement the architectural services associated with each goal to one or more of the tiers.

BRIEF DESCRIPTION OF THE DRAWINGS

FIGS. 7 and 8 are sequence diagrams illustrating a subset of the tiers of FIG. 1 and a mapping of architectural capabilities onto the subset of tiers to achieve a desired architectural goal (i.e., mapping of architectural aspects by applying a pattern to the sequence diagram of FIG. 7 to create the sequence diagram of FIG. 8)

DETAILED DESCRIPTION OF THE PREFERRED EMBODIMENTS

The invention is directed to a modeling method for standardizing design and development efforts for multi-tier enterprise applications. The method involves grouping the services provided in each tier of a multi-tier environment into three layers (i.e., a protocol services layer, a business services layer, and an architectural services layer) and then progressively building a model layer upon layer. In this fashion, a relatively complex enterprise application can be modeled in smaller, more readily understood steps. According to an important feature of the invention, the modeling method is performed by mapping the protocol services, the business services, and the architectural services to the tiers of the multi-tier environment or distributed computing system. Further, the modeling method provides a matrix tool for facilitating matching or mapping non-object-oriented systems to the object-orient multi-tier environment.

This modeling method could be used for any distributed system based on a programming language that supports the use of procedures. It is particularly apt for use in designing and developing multi-tier applications with object-oriented languages because of the capabilities of such languages to support application modularity through components. In addition, a component-based architectural model, which supports modular application development while allowing the application to leverage server capabilities, is ideal for this method. Hence, the following description and figures stress the use of the invention with the Java™ 2 Platform, Enterprise Edition (J2EE) and using JavaT™ language and programming environment conventions. The J2EE platform provides a well-known and well-defined multi-tier environment which is well-suited to this method because the model is defined in terms of well-differentiated tiers, each adapted to support a standard kind of component model. Java™ is a widely-accepted object-oriented programming language that is readily understood and used by those skilled in the application programming arts. While J2EE and Java are used in the following examples, those skilled in the art will understand that the modeling method is useful with any multi-tier, distributed computing system and the modeling method is not intended to be limited to use with J2EE and Java applications. Similarly, the following description utilizes the Unified Modeling Language (UML) diagrams and techniques for use in some of the mapping steps and to provide illustrations of the modeled multi-tier application that are readily understood by those in the industry. Again, many of the techniques described with respect to the modeling method of the invention can be implemented using different illustration and diagramming methods and these are considered within the breadth of the invention.

Figure 1:
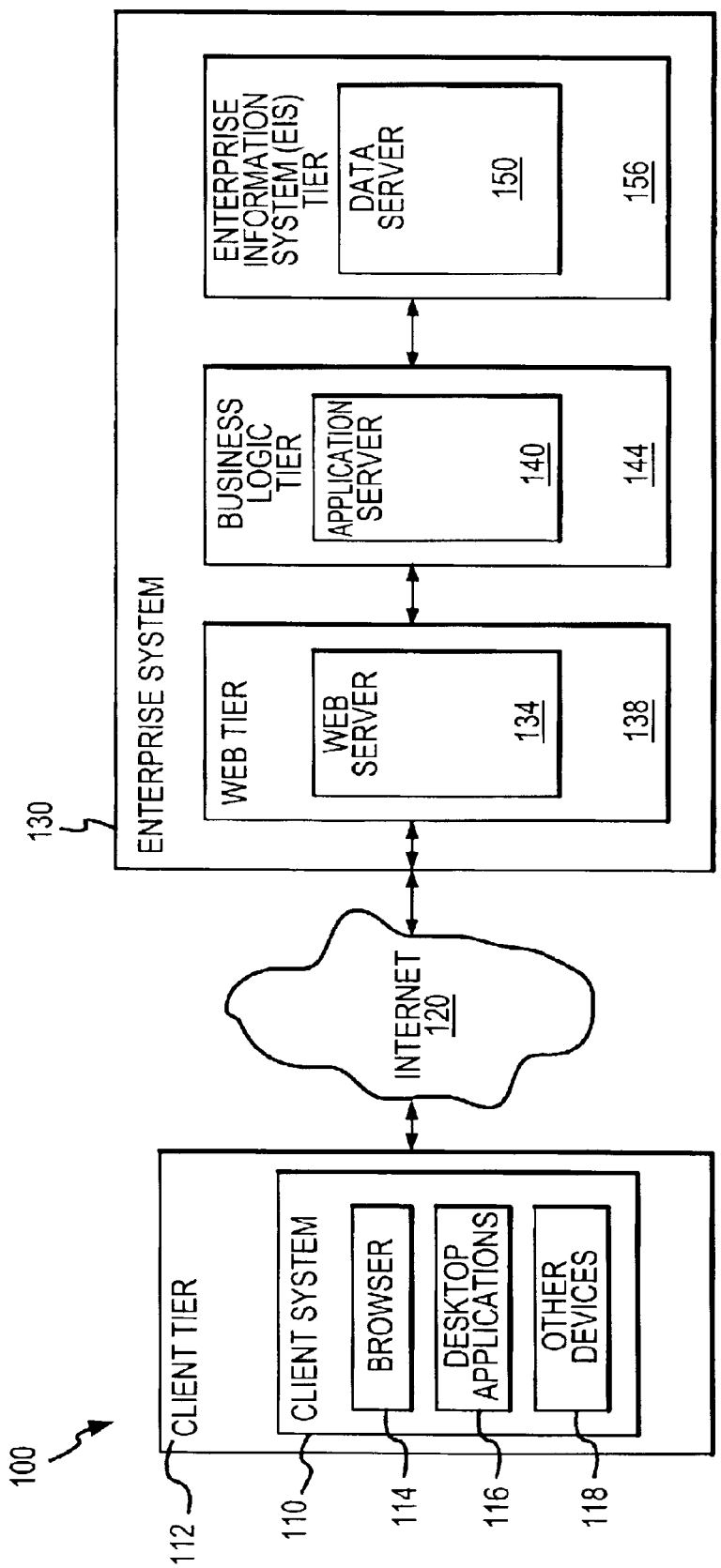
FIG. 1 illustrates a simplified distributed computer system utilizing a multi-tier application environment to provide a client services that can be modeled and developed according to the present invention.

FIG. 1 illustrates a distributed computing system 100 illustrating a tiered environment or system in which enterprise applications (such as an e-commerce application) may be run and which can be modeled effectively with the modeling methods of the present invention. The functions and services of the system 100 are described in a client/server, de-centralized computer network environment with communications transmitted over a digital communications network, such as the Internet 120. The description of system 100 provides a brief discussion of some of the features of a distributed, multi-tier system with J2EE features. Once the exemplary and simplified system 100 is understood the discussion will proceed to a detailed discussion of the modeling method of the invention with reference to FIGS. 2–9.

In the following discussion, computer and network devices, such as the client device 110, enterprise system 130, and servers 134, 140, 150, and software applications and memory structures are often described in relation to their functions rather than as particular electronic devices and computer and software architectures. To practice the invention, these computer and network devices and software applications may be any devices and software useful for providing the described functions, including well-known data processing and communication devices and systems such as personal computers with processing, memory, and input/output components. Many of the network devices may be server devices configured to maintain and then distribute software and data over the data communications network 120. The communication links between the components and the communications network 120 may be any suitable data communication links, wired or wireless, for transferring digital data between two electronic devices (e.g., a LAN, a WAN, an Intranet, the Internet, and the like). In a preferred embodiment, data is communicated in digital format following standard protocols, such as TCP/IP, but this is not a limitation of the invention as data may even be transferred on storage mediums between the devices or in print out form for later manual or electronic entry on a particular device.

As illustrated, the system 100 includes a client device 110 linked to the Internet 120 and an enterprise system 130 also linked to the Internet 120. The client device 110 may be a typical desktop, notebook, or other computer used by an individual to access services provided by the enterprise system 130, which may be a networked service provider such as an e-commerce business selling goods or providing services to a user of the client device 110. The services provided by the enterprise system 130 and communications between the client device 110 and the enterprise system 130 via network 120 are provided by enterprise applications over multiple tiers. The system 100 enterprise applications are partitioned or encapsulated in components or logic in each tier that provide desired business functions and presentation of information.

A client tier 112 is provided in the client device 110 to represent a number of client types and to perform client-side presentation. For example, the client tier 112 could be a Web browser 114 to allow enterprise applications or service to interact with the client device 110 via dynamically generated HTML pages and forms. To this end, the browser 114 may include applets or other presentation logic. The client tier 112 may also be a desktop application (such as Java™ technology-based program) 116 or another application (such as J2EE clients or CORBA clients) 118 to allow the client device 110 to interact more directly with the enterprise system 130 and its services by directly exchanging business data or other data. This raw content is typically in the form of XML or other language documents that are exchanged between the client device 110 and the enterprise system 130 service using HTTP or other network 120 protocols. The flexible client tier 112 provides the developer of enterprise applications with a broad range of choices for presenting data and a distributed application's user interface over the Internet 120 or some other distributed communication channel.

In the enterprise system 130, the Web tier 138 is associated with a Web server 124. The Web tier 138 is included to present business functions or business logic tier 144 services to the client tier 112 as simple to access Internet-style services. The Web tier 138, for example, may provide a user interface to the client tier 112 by presenting dynamically generated HTML pages to the browser 114. The Web tier 138 may utilize JavaServer Pages™ technology and servlets to provide such dynamic pages and presentations to the client tier 112. An application server 140 is provided with a business logic tier 144 for implementing the business functions (e.g., shopping cart behaviors or other relatively standard functions and/or specialized customer services) of the multi-tier application being run on or performed by the enterprise system 130. The business logic of tier 144 is typically encapsulated in components, such as Enterprise JavaBeans™ (EJBs) with the server 140 referred to as an EJB server. A data server 150 with an enterprise information system (EIS) tier 156 is provided to allow the business logic tier to store, access, and update data and typically includes a relational database and/or legacy systems and other enterprise computing systems. A number of application program interfaces (APIs) are typically included in the Web and business logic tiers 138, 144 to communicate with the EIS tier 156 and enable specific enterprise application capabilities. For example, in J2EE embodiments of system 100, one or more of the following standard Java™ service APIs may be included: JDBC™ (an API for accessing relational data), Java Naming and Directory Interface™ (JNDI) (an API for accessing information in enterprise name and directory services), Java™ Message Service (JMS) (an API for sending and receiving messages via enterprise messaging systems), JavaMail™ (an API for sending e-mail), the J2EE Connector Architecture, and JavaIDL (an API for calling COBRA services). Underlying the tiers 112, 138, 144, and 156 is a communication platform that provides a set of facilities used to implement intra-tier communication for the system 100. Additionally, the platform may provide standard services to support the development, deployment, and configuration of enterprise application software. For example, the J2EE core may be utilized which provides and/or defines standard services at each tier 112, 138, 144, and 156 to facilitate the compartmentalization of the services of the enterprise application.

According to one important aspect of the invention, the inventors recognize that modeling a multi-tier application in the system 100 can be a difficult task and address this problem by categorizing the services provided in the tiers 112, 138, 144, 156 into three distinct types—protocol, business, and architectural services. The three kinds of services enable enterprise application behavior to be modeled across multiple tiers. Furthermore, the categorization of services enables enterprise application design to be managed in a layered approach, since it is possible to represent the services in a hierarchical manner. Protocol services provide the infrastructure for the tiers of the enterprise system and act as a foundation for business services. Business services in turn provide an initial framework for the architectural services. As a consequence of this approach, enterprise application design can be managed in stages, with relatively simple modifications to the previous model at each step of the process. This enables complex architectures to be built up as a series of simpler modeling steps. Significantly, the modeling of each layer can be performed over one, two, three, or all of the tiers 112, 138, 144, 156 rather than modeling a single tier in system 100 in isolation.

Figure 2:
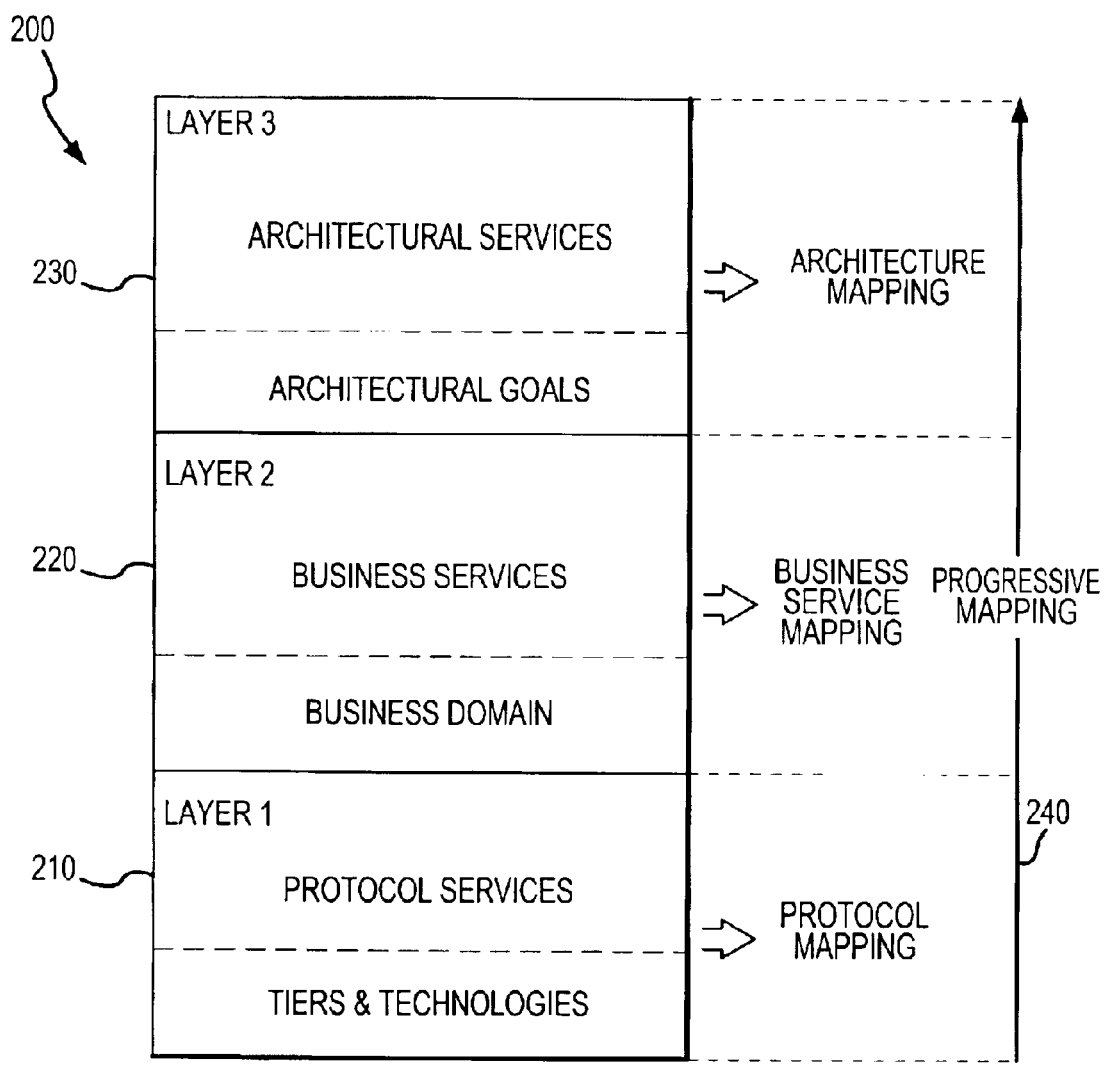
FIG. 2 is a service model according to the present invention showing the grouping of services provided by tiers into layers that can be progressively or sequentially built or developed to create a model of a multi-tier application.

Referring to FIG. 2, a multi-layer service model 200 is provided in which each of the services provided by the tiers 112, 138, 144, 156 can be placed, thereby defining when in the modeling process the service is to be mapped. As illustrated, the layered model 200 includes three layers 210, 220, 230 that are progressively or sequentially modeled (as indicated by arrow 240). In other words, the first layer 210 provides a foundation for the second layer 220 which in turn provides a foundation for the third layer 230. By modeling one layer of the model or structure 200 at a time, the complex process of modeling a multi-tier application for system 100 can be handled in a simpler, more effective fashion that still results in a working, well-coordinated design for a multi-tier enterprise application.

As shown, the lower layer 210 includes the protocol services provided by the tiers of system 100. The protocol services are defined by and based upon the modes of communication or communication protocols used to exchange information between tiers of the system 100. The protocol services of the first layer 210 form the foundation of a multi-tier computing environment, such as that provided by J2EE which provides the concept of containers for components with communication protocols associated with each container. The protocol services of the first layer 210 tend to drive or support the horizontal partitioning of an enterprise system. The protocol services of layer 210 are based on the tiers of the system 100 and the underlying technologies utilized for communication between the tiers 112, 138, 144, 156. The technologies include the "language" used by the software or logic components in each tier 112, 138, 144, 156 to communicate.

The middle or second layer 220 includes the business services provided by the tiers 112, 138, 144, 156. The business layer 220 can be thought of as built on or based on the underlying business domain of the enterprise system 130 and enterprise application being designed and developed. The business services in layer 220 represent the core functionality of the enterprise application or functional requirements of the system 100. The business services of layer 220 tend to be driven from the client tier 112 by anticipated uses (which can be modeled with use cases of the UML or by other techniques that describe anticipated use scenarios) which are further defined by a series of transformations as the anticipated uses and functions move or migrate toward the EIS tier 156. These transformations are supported by the nature, responsibilities, and unique capabilities of each tier 112, 138, 144, 156. In object-oriented settings, business services of the second layer 220 are normally grouped together according to like services within a well-encapsulated model, which tends to encourage a natural vertical partitioning within a system 100 and enterprise system 130. Vertical partitioning is the process of dividing a distributed application according to business functionality. Using this technique, systems are designed around business operations and extend "end-to-end" (i.e., from the client tier to the EIS tier). In contrast, horizontal partitioning is the process of dividing a distributed application according to distributed communication technologies.

At the top of the layered services structure 200 is the architectural services layer 230 which is built around or based on the architectural goals for the enterprise application and/or the enterprise system 130. This service layer 230 is included to allow a developer to select particular configurable architectural characteristics, which may be supported by APIs or managed/configured within one or more tiers of the enterprise application. The service layer 230 also allows a developer to attempt to implement or augment each of the architectural goals or services in one or more of the tiers 112, 138, 144, 156 as applicable. Some of the architectural services and capabilities that can be goals in the layer 230 include: security, transactions, resource management, scalability, flexibility, and maintainability. In one useful embodiment, the system 100 implements J2EE which tends to support the inclusion of the architectural layer 230 and the application of such capabilities to the tiers 112, 138, 144, 156. In J2EE, directly configurable architectural services include but are not limited to security, transactions, and resource management. Architectural characteristics that are indirectly supported by J2EE include scalability, flexibility, and reusability. J2EE systems tend to support scalability due to the tiered construction and the capabilities of the containers associated with each tier 112, 138, 144, 156; the systems tend to support flexibility and reusability because of the component-based application model.

Figure 3:
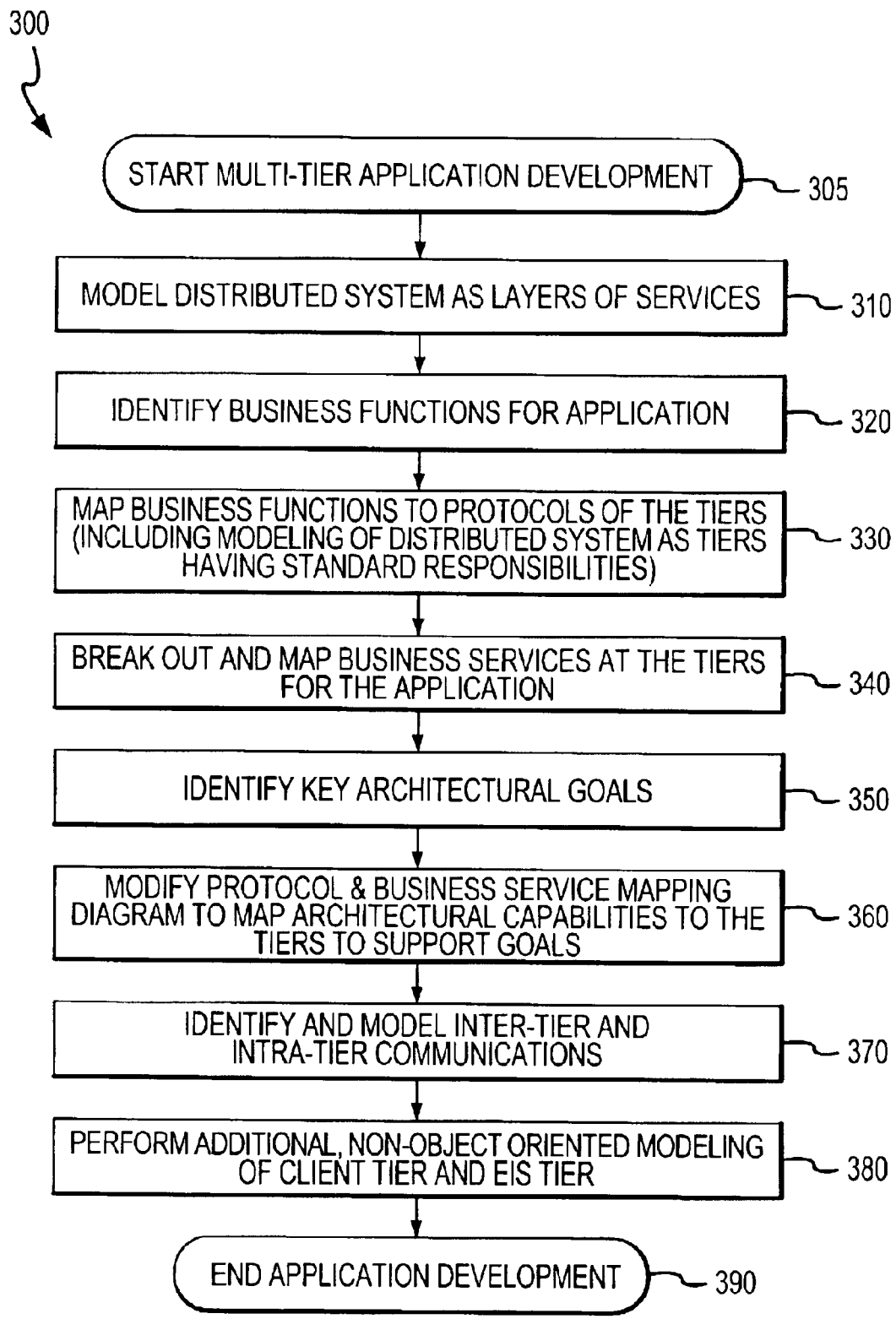
FIG. 3 is a flow diagram showing exemplary steps taken to develop a multi-tier application including the mapping of the service layers shown in FIG. 2 to a tiered distributed computing system.

According to an important aspect of the invention, a standardized multi-tier enterprise application modeling and development process 300 is provided as shown in FIG. 3. The modeling and development process 300 is particularly well suited for multi-tier systems such as system 100 and more particularly, to systems 100 implementing multi-tier environments that are component and service-based (e.g., object-oriented and responding, typically, to function calls). The general steps of the method 300 are described below in detail with additional reference to FIGS. 4–9. These figures show sequence diagrams useful for mapping the three layers from structure 200 to the tiers 114, 138, 144, 156 and show a matrix tool that is useful for mapping or matching relational databases and other persistent storage mechanisms to the object-oriented tiers 114, 138, 144, 156. The modeling method 300 begins at 305 with initiation of the multi-tier application development, which typically involves a general planning of the application, the need for the application, and assigning of developers to the process 300.

Figure 5:
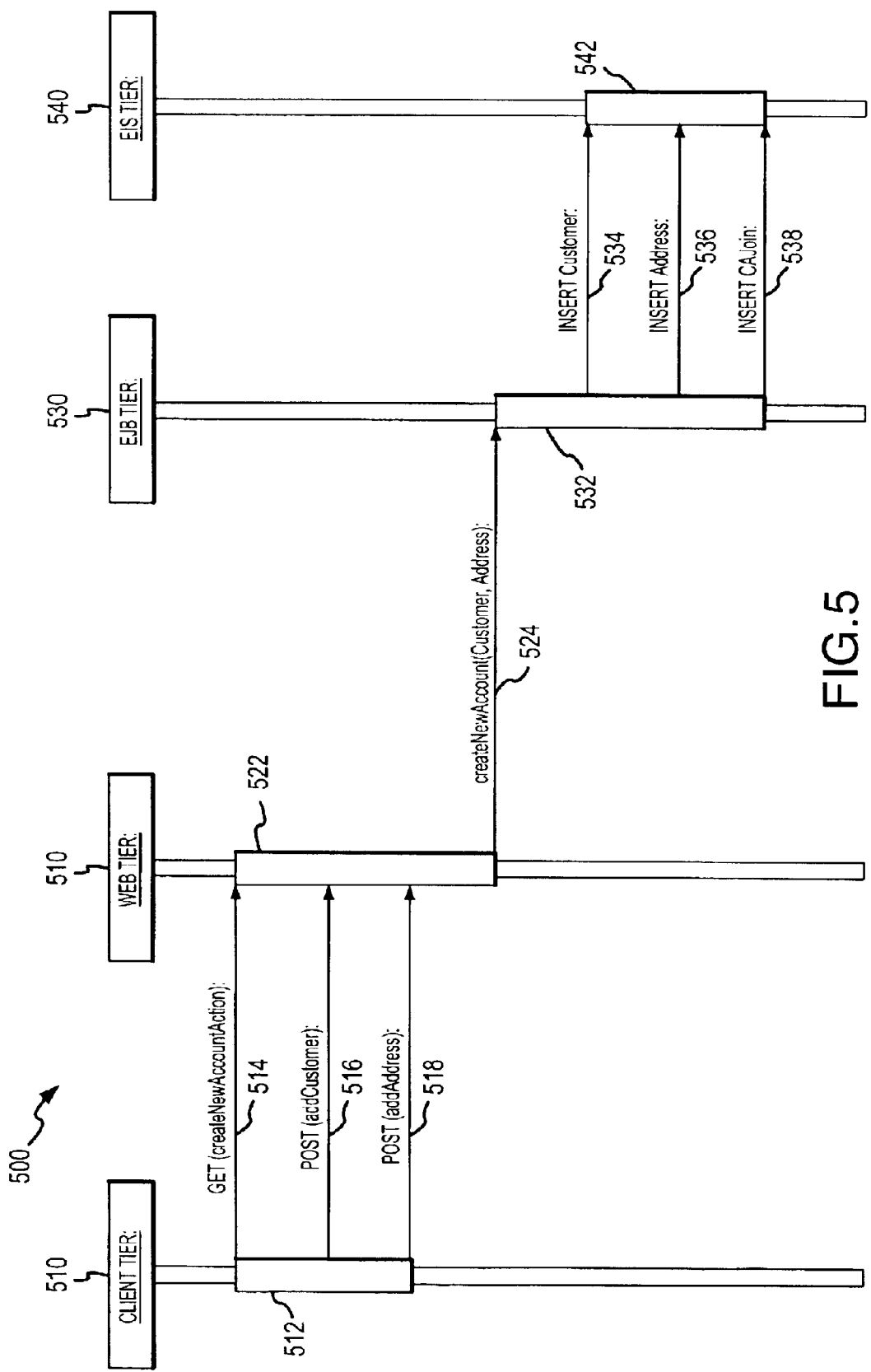
FIG. 5 is a sequence diagram illustrating the mapping of protocols or protocol services to the tiers of FIG. 1.

At 310, the system 100 with its multi-tiers 112, 138, 144, 156 is modeled or organized by its protocol services, business services, and architectural services in a layered fashion as shown by structure 200 of FIG. 2. Again, the services in layers 210, 220, 230 may exist in a single tier or cross to two or more of the tiers 112, 138, 144, 156. The protocol services 210 provide the initial structure that can be modeled, by first representing the tiers 112, 138, 144, 156 and then mapping business operations to protocol-specific communication between the tiers 112, 138, 144, 156 (as shown in FIG. 5). The business services of layer 220 can then be added as an "overlay" style to the modeled or mapped protocol services 210 with differentiation based on the standard tier responsibilities. Next, the third layer 230 architectural services can be mapped to the model of protocol and business services on the tiers 112, 138, 144, 156, selectively modifying parts of the model to promote specific capabilities of the system 100 architecture. This modeling technique uses the protocol services as a foundation, then adds and subsequently refines the business services. At any point during the process, it is possible to effectively visualize or model the system. Furthermore, it is a straightforward process to modify or augment the system as the business behavior becomes better understood.

At 330, the developers work to identify the intended business functions or services of the enterprise application. This task can be performed in a number of manners to practice the invention such as with simple text or with diagrams or both to identify use scenarios for the application. For example, use cases as defined and explained in the UML may be effectively used to identify the basic business services provided by the planned enterprise application. Optionally, step 320 can be an iterative process where a second group of use cases (and associated diagrams and/or text) are prepared to further articulate the detailed business services for the basic business services and typically, relating these detailed services to each of the tiers 112, 138, 144, 156. The use cases (or other tools used at step 320) are useful for providing a set of scenarios detailing anticipated interaction with users of the enterprise applications including human operators, components within the application, and external systems and anticipated actions taken by the application in response to such interactions.

Figure 4:
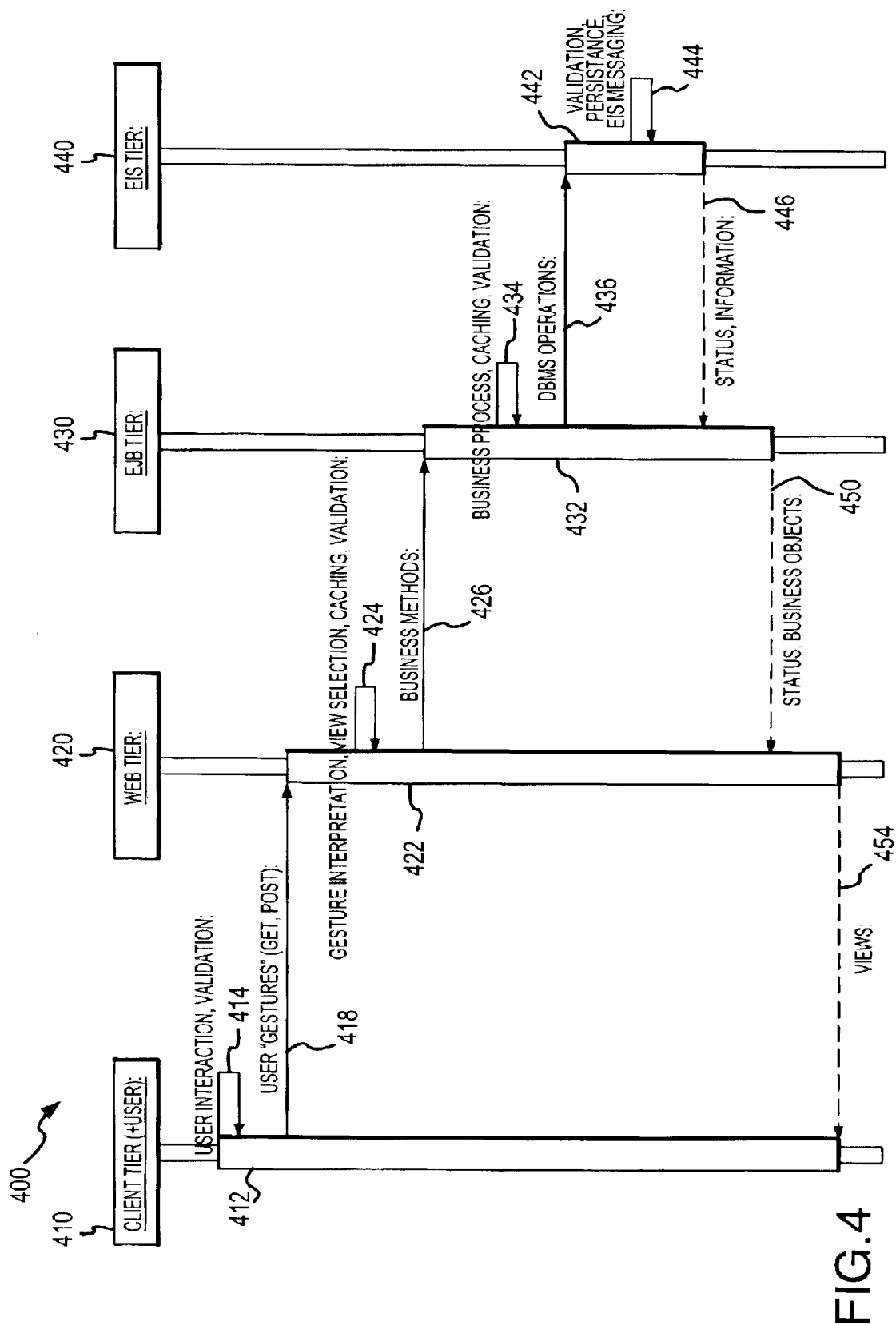
FIG. 4 is a sequence diagram (in this case, a UML sequence diagram) illustrating the mapping of standard responsibilities or functions to the four tiers of FIG. 1.

With the model 200 and business functions of the application understood, a key aspect of the method 300 can be initiated at 330. The method 300 revolves around the idea of mapping the services of structure 200 to the multi-tier environment of system 100 in a progressive fashion. In this instance, service mapping is the association (such as by utilizing UML tools and techniques with an understanding of the multi-tier environment provided by J2EE or other platforms) of behaviors or functions to one or more tiers 112, 138, 144, 156. Referring to FIG. 4, the initial model 400 for service mapping is created by providing a sequence diagram for the tiers 112, 138, 144, 156 and mapping the protocol services of layer 210 and other standard responsibilities of the tiers 112, 138, 144, 156. The basic objective of service mapping is to provide a straightforward way to represent multi-tier systems, such as system 100, during the successive addition of services to the model of the application. This requires tools which are able to adequately support the modeling needs at each part of the system. In this regard, many of the steps of method 300 can be effectively performed using standard UML diagrams (such as use case diagrams, sequence diagrams, and activity diagrams) with the addition of other tools (such as the matrix tool shown in FIG. 9) for non-object-oriented portions of the system 100 (such as parts of the client and EIS tiers 112, 156).

As a first action at 330 (and/or 310), the system 100 can be diagrammed or modeled to show the standard services provided by each tier 112, 138, 144, 156 and/or to map the protocol services. This is a useful step for helping developers to visualize by tier the functions and capabilities typically provided by each tier in the system 100 (which may vary based on whether the system 100 is a standard J2EE system or is based on another multi-tier, distributed computing platform). The standard infrastructure diagram or model 400 utilizes a UML sequence diagram to show the four tiers as objects 410, 420, 430, and 440 with vertical lifelines showing activation of the tiers at 412, 422, 432, and 442, respectively. The protocol services and standard responsibilities are provided with messages or function calls 418, 426, 436; self-calls 414, 424, 434, 444; and returns 446, 450, 454. Each of these are named or described with text providing an indication of the services being provided by each of the tiers 410, 420, 430, 440. The particular protocol services mapped on the initial model 400 may vary depending upon the underlying platform (such as J2EE) and the communication protocols in place in system 100. The names given to calls and returns will either be dictated by the protocol (for protocol services) or will be a function of the business operation being performed (for business and architectural services). The call flow can likewise vary, depending on the nature of the protocol and the flow of business operations.

The protocol mapping performed to create initial model 400 involves mapping the functions performed by each tier 410, 420, 430, 440 based on the underlying protocol. Protocol mapping can be thought of as a translation between modes of communication and the tiers of a system 100 and typically involves impedance matching (i.e., translation between the multiplicity of callers and the time scale of the two software modules). Protocol service mapping is technology-driven as it depends on the language the application and other software speaks and the language of a particular tier. In other words, protocol service mapping is driven by the characteristics of the protocol itself, which in turn is driven by the protocol's intended use. For example, Web services in the Web tier 138 are often not well-suited for transactions since the protocol is designed to be based on one client request per operation since the Web service is intended to support as many callers as possible with their available resources. As another example, communications between the Web tier 420 and the application or business logic tier 430 (at least in J2EE) depend on mapping between HTTP and RMI-IIOP communications.

Additionally, at 330 of the modeling process 300, business service mapping is performed to map the business functions identified in step 320 to the initial model 400. Hence, business mapping at 330 is defined by operations specified in the use cases of step 320 through a series of successive translations from user interaction with the client tier 112 to business operations and transactions in the Web tier 138 and business logic tier 144 and finally, to entity operations such as storing information in the EIS tier 156. The general flow of business mapping to the tiers is from user interface actions (high level) to business operations (high level business actions) to business transactions (lower level coordinated groups of business functions) to operations on one or more entities (such as storage of data in a relational database or sending a message). Some stages of this translation may be skipped if appropriate (e.g., some enterprise applications have no need for transactional coordination). Note, business operations and business entities are really peer concepts that may be taken in either order or may both be present on a single tier. Usually, entity operations represent the lowest level of business services because they are the primary concern or responsibility of the EIS tier 156. In other words, the translations provide a stepwise transition and mapping of services from high level user interactions to progressively more detailed functions until specific actions at the EIS or data storage tier 156 are mapped.

FIG. 5 illustrates a first stage of an exemplary business service mapping in which the general business operations are mapped to the client tier 510, the Web tier 520, the EJB tier 530, and the EIS tier 540. The example shown in FIGS. 5–9 is simplified for explanation purposes and addresses the simple function of creating a new account for a customer in an enterprise application. Typically, many more business functions would be added to the model 400 based on the use cases created in step 320 or otherwise. Each of these mapped functions can be seen to be an overlay of services on the initial protocol model 400 or a modification of the model 400. In this manner, the modeling 300 can be seen as progressive (e.g., layer 220 being built on layer 210 of FIG. 2). As shown, the client tier 410 is activated 512 and messages or function calls 514, 516, and 518 are created at the interface between the client tier 510 and the Web tier 520 which is activated at 522. Business services mapping between the client and Web tiers 510, 520 can be thought of as identification and mapping of the business actions provided by the modeled enterprise application.

The initial business service mapping continues by adding basic services between the Web tier 520 and the EJB tier 530 with the inclusion of a call or message 524 and the activation of the EJB tier 532. This mapping step identifies and maps the business operations driven by this particular use case.

Note, at this point in the business service mapping, developers may identify a need for information caching. Repeat business operations which do not involve a database indicate a cache may be needed. Based on the needs of the business services or model, developers can choose one of several caching strategies which can then be mapped to the appropriate tier (such as Web tier 520 caching to support client business processes, EJB tier 530 caching to support enterprise business processes, or flow-through caching in the EIS tier 540 to provide support at the data base management system or other data structure level with transactions). The business services mapping continues with mapping of business operations (such as detailing database operations) between the EJB tier 530 and the EIS tier 540. The illustrated operations include several insert messages 534, 536, 538 that activates 542 the EIS tier 540. In this manner, sequence diagram 500 is built by mapping general business services to the tier 510, 520, 530, 540 protocols provided by lower layer (from FIG. 2), initial sequence diagram 400 (e.g., based on HTTP, RMI, and sequel queries).

Figure 6:
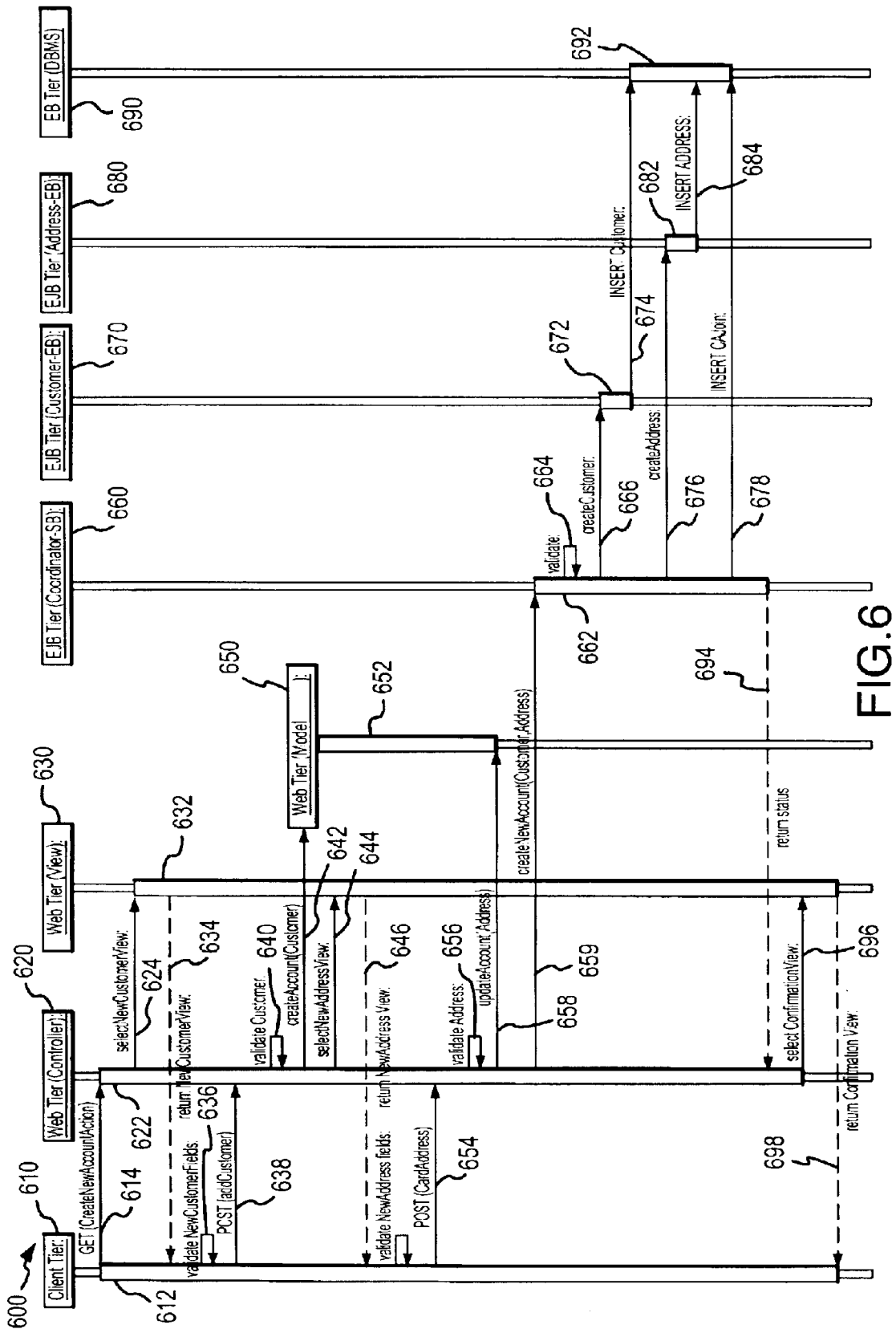
FIG. 6 is a sequence diagram illustrating the mapping of business services to the tiers of FIG. 1, such as by modifying and/or adding to the sequence diagram of FIG. 5.

Once the standard services model 500 is completed, a significant portion of the modeling method 300 is provided at 340 by further articulating or defining the business services to be provided by the tiers 510, 520, 530, and 540. The process 340 can be thought of as breaking out or redesigning specific services at tiers and involves modifying all or parts of the sequence diagram 500 to differentiate the business functions in the tiers of system 100 in FIG. 1 (e.g., transformation of business operations to business transactions). A sequence diagram 600 is shown in FIG. 6 illustrating the use of such a redesign and mapping of more detailed business services to the tiers of FIG. 1. It is important to note that the redesign of the previous model to represent more detailed business services preserves the initial protocol mapping which was performed in earlier stages. The new model is based on refining and augmenting the previous model, rather than replacing it. Significantly, the tiers 520 and 530 are further divided to provide more detailed and useful modeling of the services of the enterprise application. As will be seen, these tier divisions are performed in a standard and repeatable manner.

As shown in FIG. 6, the sequence diagram 600 includes some of the same services at each tier but includes further detail for some services (e.g., with the services being shown in more detail) or adds additional services (such as those available on the standard services diagram 400). For example, the client tier 610 is activated at 612 and includes the messages or calls 614, 638, 654 of FIG. 5 (as were shown as messages 514, 516, 518) but further includes validation self-calls 636 and 648. As will become clear, some preferred embodiments of the modeling method 300 include or encourage utilizing validation at earlier stages or toward the client tier 610 rather than at later stages or the EJB or EIS tiers to minimize performing services on what later turns out to be an invalid message or portion of a message. In the illustrated example, the client tier 610 performs the validation service at 636 for fields of the returned 634 new customer view prior to placing a call 638 to add the new customer and further and performs the validation service at 648 prior to placing a call 654 for fields of the returned new address. By using validation in the earlier tiers (such as the client and Web tiers), the modeled application is designed with a more efficient configuration of services, with fewer calls to the EIS tier and more efficient use of connections to the EIS tier when calls are made to the EIS tier.

The Web tier 520 of the sequence diagram 500 of FIG. 5 is differentiated or divided based on the Model-View-Controller design pattern to become the controller Web tier 620, the view Web tier 630 and the model Web tier 650. Breaking out the tiers 620, 630, 650 facilitates the determination of whether services shown in diagram 500 need to be broken down into more specific services and/or whether additional services need to be shown. For example, validation, view selection, and data caching are services that are considered for each service provided by the Web tiers 620, 630, 650. As shown, the GET message 614 activates the controller Web tier 620 which responds by activating 632 the view Web tier 630 by generating a call 624 for view selection. The view selection call 624 results in a return 634 being mapped on the view Web tier 630 (which, in turn results in a validation 634 at the client tier 610). The controller Web tier 620 validates the customer at 640 prior to generating a create account call to the model Web tier 650 which is activated 652. The controller Web tier 620 further has an additional service 644 mapped to the view Web tier 630 as a result of the validation 640 and message 638 from the client tier 610. The view Web tier 630 returns 646 the called view to the client tier 610 which validates 648 the view and transmits the POST call 654 to controller Web tier 620, which responds by validating 656 the address and generating an updated address with call 658 to the model Web tier 652. As with diagram 500, a create new account call 659 is mapped from the Web tier 620 to the EJB tier 660.

The EJB tier 530 of sequence diagram 500 of FIG. 5 is differentiated into three components to support entity differentiation with a coordinator EJB component 660 (such as a session bean), a customer EJB component 670 (such as an entity bean), and an address EJB component 680 (such as an entity bean). In modifying diagram 500 to create further map business services with diagram 600, the EJB tiers 660, 670, 680 are broken out to better detail validation, to provide entity representation, and provide data caching (as appropriate). The coordinator 660 is activated 662 with the call 659 (as shown in FIG. 5 as call 524) from the controller Web tier 620 and a validation self-call 664 is mapped to the tier 620. The coordinator 660 issues a create customer call 666 to the customer 670 which is activated at 672 and responds by transmitting the insert customer call 674 (as shown as call 534 in FIG. 5) to the EIS tier 690 which is activated 692. The business service mapping of step 330 includes evaluating services provided by the EIS tier 690 with validation, cascading and trigger conditions being considered. The coordinator EJB tier 660 further generates a create address call 676 that activates 682 address EJB tier 680, which responds by generating the insert address call 684 (shown as call 536 in FIG. 5) to the EIS tier 690. The coordinator EJB tier 660 also issues the insert call 678 to the EIS tier 690 (as shown as call 538 in FIG. 5) and then generates a status return 694 to the calling controller Web tier 620. The controller Web tier 620 responds by calling for another view selection 696 from the view Web tier 630, which responds with a view return 698 to the client tier 610.

The detailed business service mapping of 330 shown in FIG. 6 involves evaluating the inclusion of validation and/or caching at several tiers in the enterprise system. Generally, validation is encouraged earlier in the service flow since some forms of validation can easily be performed early in the enterprise system communication process (i.e., closer to the client), which reduces the load on EIS systems and avoids invalid requests for EIS resources. The hierarchy of validation can be summarized as follows: field-level (ensuring data is non-null and of the proper format); object-level (ensuring that data is correct in combination; that all field values can be combined to produce a valid object);

business operation (that all object data and authentication data is present for a given business action); business sequence (that a particular operation is correct and appropriate as part of a larger series of business operations); and entity validation (ensuring that there are no data conflicts or conflicts in the relation between data entities).

The location of mid-term persistence data (e.g., a data cache) is generally governed by the intended use of that cache. If the data is built up based on repeat activity by a client (and/or supports a deterministic, well-defined business operation), it will be appropriate to store it closer to the client, for example, in a tier such as the Web tier). In J2EE systems, there are a number of standard classes and technologies that can be used to implement caching. At the Web tier, the ServletContext, HttpSession or JNDI can be used; at the EJB tier, caching of stateful SessionBeans or JNDI can be used; and at the EIS tier, persistent storage mechanisms such as database management systems can be used.

The sequence diagram of FIG. 6 shows a service mapping based on caching information at the Web tiers 620, 630, 650. For this approach to be used in caching business information, each call from the client tier 610 (i.e., the POST calls 638 and 654) is stored in the cache represented by the Web tier model 650. The Customer and Address objects are stored to the cache using a create 642 or update 658 method call. This approach is standard for information being stored in the Web tier of a J2EE system; incoming information will be validated (which may also involve conversion to an object) and be stored in the cache until the final business operation is performed —in the illustrated case, createNewAccount 659.

If the system were caching information in the EJB tier 660, 670, 680, this pattern of calls would be somewhat different. In that scenario, a client call to POST (addCustomer) would result in validation on the Web tier, followed by a direct call the EJB tier to perform a createAccount action. After making the call, the Web tier would return the newAddressView to the client tier as before. The only modifications to the system for moving the cache to the EJB tier would be to shift the create/update calls to an EJB, rather than a Web tier component. An EJB component, such as a stateful Session Bean, would have to be added to the EJB tier, and the EJB tier would now be responsible for session management, but the functional flow of the application would otherwise be very similar.

The two cache management illustrations described demonstrate two important traits of cache management in an enterprise system. First, the flow of cache management can be performed in a standard, consistent manner for a given enterprise tier. Second, specific cache management mechanisms will depend on the capabilities of the tier and its associated protocol; in this specific example, a J2EE Web tier would probably use an HttpSession to hold cache, while a stateful Session Bean would be used for the EJB tier.

Referring again to FIG. 3, the modeling method 300 continues at 350 with the identification of the architectural goals to be mapped or implemented in the enterprise application. At 360, the sequence diagram 600 is modified to map architectural capabilities to the tiers to support these goals. This mapping can be performed using patterns known in the art (such as the use of J2EE patterns such as Data Access Object (DAO), Value Object (VO) to promote flexibility and resource management) for providing or supporting the architectural goals. In general, architectural mapping involves the further modification of existing enterprise models (such as diagram 600) to support the desired architectural objective(s). Architectural mapping at 360 is driven by application-wide considerations, priorities, and objectives and, hence, can be difficult to localize to a specific part of the model 600 or development process. However, component-based architectures make it possible for some architectural characteristics and services such as flexibility, extensibility, security, and the like by making specific, localized modifications to the model 600 for developers to improve the overall architectural feature.

FIG. 7 provides a partial view 700 of the sequence diagram 600 modeling services of an enterprise application. As shown, the client tier 710 is activated at 712 and generates the create new account call 714 to the controller Web tier 720 which is activated at 722. The controller Web tier 720 generates view selection call 724 to the view Web tier 730 that is activated and returns a new view 736 to the client tier 710. While providing an effective mapping of the services provided by these tiers 710, 720, 730, an architectural goal identified at 350 may be to promote flexibility and reusability of the enterprise application or portions of the application. To achieve these architectural goals, the sequence diagram (or portion of model 600) 700 may be modified to implement desired architectural capabilities with or without the use of a pattern.

FIG. 8 illustrates how the model 700 of FIG. 7 can be modified with a view dispatcher pattern mapping additional architectural services to promote the architectural goals in the tiers of flexibility and reusability. The revised sequence diagram 800 again includes a client tier 810 which is activated 812 and generates a create new account call 814. The controller Web tier 820 is also included in this diagram or model 800 and is activated at 822. Additionally, sequence diagram 800 includes a dispatcher 830 between the controller Web tier 820 and the view Web tier 840. The mapping of the view dispatcher pattern in FIG. 8 includes adding the create new account delegate message being transmitted from the controller Web tier 820 to the dispatcher 830 which becomes activated 832 and generates the select new customer view dispatch method. This activates 842 the view Web tier 840 which returns 848 the new customer view.

While FIGS. 7 and 8 are simple examples of architectural services mapping, these figures are useful for illustrating the use of architectural services mapping to achieve an architectural goal. This type of process would be repeated at 360 for each of the goals (such as resource management, server loading, maintainability, security, and the like) to support the underlying capabilities provided by the platform of the system 100 and correct for any service concerns. Again, modifications may be localized to one tier (as shown in FIGS. 7 and 8) or may cross two or more tiers.

After the architectural services have been mapped to the tiers of system 100 the enterprise application model may be considered complete or optionally, at 380, the inter-tier and intra-tier communications and interactions may be further identified and modeled. Typically, such interactions are modeled using different diagrams (not shown) than the sequence diagrams of FIGS. 4–9. For example, UML activity diagrams may be employed to describe the sequencing of activities in the tiers of system 100 showing conditional and parallel behaviors within the tiers. The detailed interactions and actions taken by the tiers 112, 138, 144, 156 during while running the enterprise application may also be modeled or diagrammed using other tools such as state diagrams, event diagrams, workflow modeling, Petri nets, and many other process flow tools known in the art. The results of the detailed activity modeling in step 370 may be used to modify and/or repeat prior mapping of services in steps 330, 340, and 360 and may result in architectural goals being added at 350 to improve the enterprise application.

Another important aspect of the enterprise application modeling method 300 is the modeling of portions of the client tier 112 and the EIS tier 156 which are not solely object-oriented systems. Step 380 calls for additional modeling of the client tier 112 and the EIS tier 156 which may not be achieved effectively with sequence diagrams or other UML tools. This modeling, of course, may occur at any point in the modeling process 300 and often will occur prior to mapping at 330, 340, and 360.

Turning to the client tier 112, the role of the client tier 112 is to provide the application functionality to the user of the client device 110 in a logical, intuitive way and to provide the data from the modeled enterprise application in an easy to use format. Although a UML use case diagram provides an effective way to show what operations a user can perform, the design and modeling at 380 of front end content for the client tier 112 typically is better achieved through the use of other design techniques aimed at understanding how the user will interact with the enterprise application. For example, storyboarding can be used at 380 and supplemented or reinforced by applying principles of ergonomics and standards for effective graphical user interface (GUI) design.

To model the EIS tier 156, the method 300 at 380 calls for the use of additional tools to map between non-object-oriented systems, such as relational databases, and the object-oriented model present in the EJB or business logic tier 144. The EIS tier 156 provides shared global resources for the enterprise application being modeled. EIS resources typically provide one or more of the following services: persistent storage and validation of shared data; global behavior and processing; and communication with another enterprise system or external systems. With EIS resources in EIS tier 156, the sequence diagrams of FIGS. 4–8 can be implemented effectively. However, the most common system for EIS tiers 156 is the RDBMS, which can be better modeled using object-relational (O-R) mapping when modeling the enterprise application. To address this problem, a preferred embodiment of the method 300 calls for at 380 the use of the matrix tool 900 shown in FIG. 9, which can be thought of as a select, insert, update and delete (SIUD) matrix which is better suited to J2EE and other multi-tier environments than prior O-R diagrams.

Figure 9:
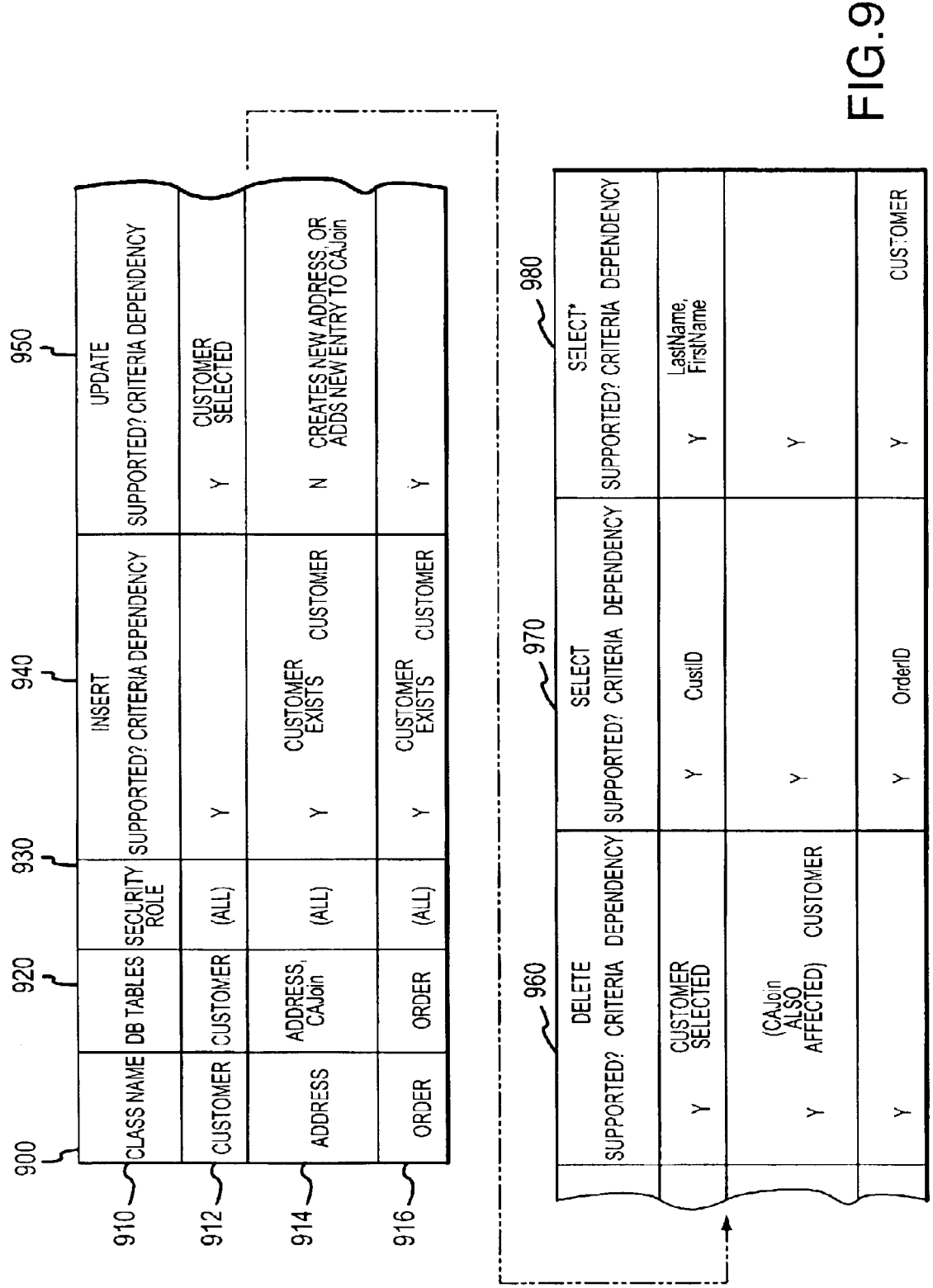
FIG. 9 is a select, insert, update and delete (SIUD) matrix used as an EIS mapping tool used to translate between an enterprise system, such as a relational datebase, and the object-oriented model used in the tiers of FIG. 1.

In FIG. 9, the SIUD matrix 900 is shown for the classes and database entities described in the simple example provided in FIGS. 4–8, but with columns that typically would be used for any object-relational (O-R) mapping efforts in step 380. As illustrated, the SIUD matrix 900 includes a column for class names 910 and rows 912, 914, and 916 for the classes associated with the enterprise application as illustrated in FIGS. 4–8. Additionally, there is a column 920 to associate each of the classes with one or more tables in the database. To facilitate O-R mapping, the matrix 900 includes a security role column 930, an insert column 940, an update column 950, a delete column 960, and select and select multiple columns 970, 980. By having a developer complete the SIUD matrix 900, a developer who does not have a complete or adequate understanding of a database configuration is able to map objects of the enterprise application to a complex EIS system (such as a relational database) of the tier 156. The columns 940, 950, 960, 970, and 980 preferably indicate whether the insert, update, delete, and select actions are supported and what special conditions may exist for when the actions can occur (e.g., criteria and dependency). Additionally, column 930 indicates the security role for users of the EIS system which identifies particular classes of objects that may have selective capability as to which users can take a given action. In the example, roles are shown as "all", but the matrix 900 could be expanded with additional rows if certain kinds of users were to have special permissions to perform operations. For example, the administrator role may be able to modify or delete data that ordinary system users could not. After the additional modeling of step 380, the modeling 300 of the enterprise application is completed at 390. By following the relatively standard process of the modeling method 300, a developer is able to model a complex multi-tier application with numerous services in a progressive, layer-by-layer fashion (i.e., using protocol, business, and architectural service mapping and the other modeling tools of the invention) that is more readily understood and more likely to be completed effectively.

The SIUD matrix 900 is a tool to help developers establish a clear picture of how an object-oriented model of information maps to persistent storage such as that which might be found in a database management system (DBMS). Furthermore, the tool 900 helps to identify which of the most common database operations—SELECT, INSERT, UPDATE and DELETE—are to be supported for which database elements, and for what conditions such operations will be permitted. This provides substantial benefit for modern enterprise systems, since most systems place conditions on the use of the database resources. One common condition is the architectural service of security as not all kinds of users may be able to perform a certain operation. The SIUD matrix 900 allows this information to be represented by allowing rows to be created for specific user roles, and to represent those roles in the "security role" column 930. This allows a developer to selectively illustrate which users can perform a specific database operation.

Another set of conditions occurs due to the need to manage the relationship between data in the DBMS. The SIUD matrix 900 provides a way to effectively represent this information by allowing developers to specify "criteria" and "dependency" information associated with a specific operation. If an operation on an entity requires that another entity be selected, that information can be shown in the diagram 940. Dependencies on other tables and database join tables can also be represented in this matrix, which therefore helps developers to better understand how operations in an enterprise applications impact the associated DBMS system in the EIS tier.

Note that, if necessary, the SIUD diagram 900 could be expanded with further columns to show if other kinds of database operations were to be supported. An example could be commands to create and delete database tables, as they are represented in the SQL Data Definition Language, for example.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

For example, the modeling method may be performed manually by a developer or may be partially or fully automated using software and logic to perform one or more of the steps of the modeling process 300 of FIG. 3. In one embodiment, not shown but readily understood by those skilled in the art, a modeling tool providing one or more steps in process 300 is provided as a client or server application. In this embodiment, a client application is provided through an IDE or other software development tool installed on the client. A server application is provided on a server accessed over a communication network such as the Internet, an intranet, or the like, or provided on magnetic storage media and then run on a computing device (such as a desktop, notebook, or other well-known computer) by a developer of an enterprise application.

When this modeling method is implemented in a tool, the modeling tool would typically represent the process of service mapping through the successive use of diagrams. This would enable developers using the tool to create a model of a system by adding modeling elements and service calls to the diagram. They would also be able to refine the model, by either selecting a part of the visual model for refinement, or by designating a subsequent overlay diagram. To preserve the stages of service mapping, such a tool would potentially save a series of diagrams, allowing developers to browse any one of their service mapping products. Developers would additionally be able to view the system at any stage during their design, and optionally print out their work. As an example, a tool could provide a graphic representation of UML sequence diagrams (and potentially use case diagrams as well) to enable developers to perform service mapping for enterprise systems.

In an additional embodiment, the modeling tool, whether provided on a client or a server system, is also able to use the model developed by using the technique of the invention as the basis to automatically generate enterprise software based upon such the created model (such as model created following the process 300 of FIG. 3). The code produced as a result of this process could serve as the basis for actions such as testing or, ultimately, producing a complete enterprise application.

For this addition to the modeling tool, the system would be able to generate the enterprise framework as a series of class files based on the model generated by developers and a designated enterprise system to act as the target. With a minimum of developer input (typically involving the selection of component type, if required) the system could produce code to match the enterprise system communication flow and produce the code framework which would otherwise require a developer's manual involvement. As an example, if the model were targeted to implementation in a J2EE system, the tool could automatically generate Web tier and EJB tier components, creating code for Servlets, JSPs and EJBs based on the specified visual model. It could additionally be possible for such a tool to provide a way to map database functionality (using tools such as the SIUD matrix and a database table specification) and automatically produce code to generate database tables, using a standard database manipulation language such as SQL. The tool could also enable graphic user interface design through the type of mechanism used in integrated development environments (IDEs), to produce a prototype for the client tier. If these options were combined into a tool, the programming tasks remaining for developers would be to code the actual business logic into the components, which could be performed manually or again made available through an IDE-type interface.

We claim:

1. A method for modeling an enterprise application to be performed over multiple tiers in a distributed computer system, comprising:
generating a model of the enterprise application including a plurality of tiers having assigned standard functions;
providing a set of business functions for the enterprise application;
assigning the business functions to the tiers based on the assigned standard functions; and
modifying the model of the enterprise application to include the business functions at the assigned tiers;
wherein the tiers include an object-oriented business logic tier and a non-object-oriented enterprise information system tier and further including using a matrix tool to map the business logic tier to the enterprise information system tier, wherein the matrix tool maps object classes of the business logic tier to one or more of insert, update, delete, and select actions of the enterprise information system tier.

2. The method of claim 1, wherein the tiers include a client tier, a Web tier, a business logic tier, and an enterprise information tier.

3. The method of claim 1, wherein the generating of the model of the enterprise application includes identifying protocol services for the enterprise application, mapping the protocol services to the tiers, and providing the assigned standard functions based on the assigned protocol services.

4. The method of claim 3, wherein the protocol services define communication methods between the tiers.

5. The method of claim 1, further including dividing at least one of the business functions into two or more detailed business functions and wherein the modifying includes adding the detailed business functions to the model.

6. The method of claim 5, further including dividing one of the tiers Into at least two subtiers and wherein the adding of the detailed business functions includes mapping at least one of the detailed business functions to one of the subtiers.

7. The method of claim 6, wherein the one tier is a Web tier and the subtiers include a model Web tier, a view Web tier, and a controller Web tier.

8. The method of claim 6, wherein the one tier is a business logic tier and the subtiers are created based on business entities in the enterprise application.

9. The method of claim 1, further including providing a set of architectural capabilities for the enterprise application and modifying at least a portion of the model to map architectural services to the tiers based on the architectural capabilities.

10. The method of claim 1, wherein the generating includes creating a sequence diagram for the tiers.

11. An enterprise application development method for a multi-tier, object-oriented computer system, comprising:
identifying protocol services for an enterprise application;
identifying business services for the enterprise application;
modeling the computer system in a sequence diagram with two or more tiers; wherein the tiers include a client tier, a Web tier, a business logic tier, and an enterprise information system tier;
mapping the protocol services to the sequence diagram;
mapping the business services to the sequence diagram; and
for the enterprise information system tier, populating a matrix matching objects to relational functions of the enterprise information system tier.

12. The method of claim 11, wherein the protocol services comprise communication protocols used to communicate between the tiers.

13. The method of claim 11, wherein the mapping includes dividing the Web tier into model, view, and controller Web tiers and mapping the business services to the model, view, and controller Web tiers.

14. The method of claim 11, further including identifying architectural services for the enterprise application arid after the business services mapping, mapping the architectural services to the sequence diagram.

15. The method of claim 14, wherein the architectural services mapping includes establishing an additional object in the sequence diagram and mapping business services and protocol services to the additional object.

16. The method of claim 11, wherein the relational functions include insert, update, delete, and select.

17. The method of claim 11, wherein the relational functions include a security indicator for the objects.

18. A computer readable medium for causing service mapping an enterprise application in a multi-tier distributed computing environment, comprising:
    first computer readable program code devices configured to cause a computer to generate a model of the enterprise application including a plurality of tiers having assigned standard functions;
    second computer readable program code devices configured to cause a computer to provide a set of business functions for the enterprise application;
    third computer readable program code devices configured to cause a computer to assign the business functions to the tiers based on the assigned standard functions; and
    fourth computer readable program code devices configured to cause a computer to modify the model of the enterprise application to include the business functions at the assigned tiers;
    wherein the tiers include an object-oriented business logic tier and a non-object-oriented enterprise information system tier and further including fifth computer readable program code devices configured to cause a computer to man the business logic tier to the enterprise information system tier including mapping object classes of the business logic tier to one or more of insert, update, delete, and select actions of the enterprise information system tier.

19. The computer readable medium of claim 18, wherein the generating of the model of the enterprise application by the first computer readable program code devices includes identifying protocol services for the enterprise application, mapping the protocol services to the tiers, and providing the assigned standard functions based on the assigned protocol services.

20. The computer readable medium of claim 19, wherein the protocol services define communication methods between the tiers.

21. The computer readable medium of claim 18, further including sixth computer readable program code devices configured to cause a computer to divide at least one of the business functions into two or more detailed business functions and wherein the modifying by the fourth computer readable program code devices includes adding the detailed business functions to the model.

22. The computer readable medium of claim 21, wherein the sixth computer readable program code devices is further configured to divide one of the tiers into at least two subtiers and wherein the adding of the detailed business functions by the fourth computer readable program code devices includes mapping at least one of the detailed business functions to one of the subtiers.

23. The computer readable medium of claim 22, wherein the one tier is a business logic tier and the subtiers are created based on business entities in the enterprise application.

24. The computer program of claim 18, further including sixth computer readable program code devices configured to cause a computer to provide a set of architectural capabilities for the enterprise application and to modify at least a portion of the model to map architectural services to the tiers based on the architectural capabilities.

25. The computer program of claim 18, wherein the generating by the first computer readable program code devices includes creating a sequence diagram for the tiers.

26. The computer program of claim 18, further including sixth computer readable program code devices configured to cause a computer to generate a computer program configured to cause a computer to provide the enterprise application, the generating being based on the modified model of the enterprise application.

* * * * *

UNITED STATES PATENT AND TRADEMARK OFFICE
CERTIFICATE OF CORRECTION

PATENT NO. : 6,968,535 B2
DATED : November 22, 2005
INVENTOR(S) : Stephen A. Stelting and Katherine J. Sierra It is certified that error appears in the above-identified patent and that said Letters Patent is hereby corrected as shown below:

Column 18,
Line 28, "Into" should be -- into --.
Line 67, "arid" should be -- and --.

Column 19,
Line 32, "man" should be -- map --.

Signed and Sealed this

Fourteenth Day of February, 2006

JON W. DUDAS
*Director of the United States Patent and Trademark Office*